United States Patent [19]

Caruso

[11] Patent Number: 5,789,471
[45] Date of Patent: Aug. 4, 1998

[54] POLYVINYL CHLORIDE COMPOSITION HAVING ENHANCED LIGHT TRANSMISSION AND REFLECTION CHARACTERISTICS

[75] Inventor: Jack Caruso, Orlando, Fla.

[73] Assignee: Super Vision International, Inc., Orlando, Fla.

[21] Appl. No.: 840,264

[22] Filed: Apr. 14, 1997

[51] Int. Cl.$^6$ ........................................ G02B 6/44
[52] U.S. Cl. ................. 524/161; 385/100; 385/102; 385/104; 385/106; 385/901; 362/32; 521/301; 521/551
[58] Field of Search ................... 524/161, 301, 524/551

[56] References Cited

U.S. PATENT DOCUMENTS 3,868,341  2/1975  Sauer et al. ........................ 523/434
5,333,228  7/1994  Kingstone ........................... 385/100

*Primary Examiner*—Morton Foelak
*Attorney, Agent, or Firm*—James H. Beusse

[57] ABSTRACT

A polyvinyl chloride (PVC) composition includes an active fluorescence or phosfluorescence inducing agent which causes the composition to emit a brighter or hotter appearing light, as compared to conventional PVC compositions, when exposed to white light. In one form, the PVC composition includes barium diphenylaminesulfonate as an additive in a clear or transparent composition and light passing through the composition appears to be hotter than the impinging light. In another form, the additive is barium carbonate and the PVC includes a tinting agent to induce a colored glow when exposed to white light. In all forms, the fluorescence or phosfluorescence inducing agent is selected from a class of materials having the characteristics of creating a compound having an outer electron shell which will permit an electron shift between shells when exposed to light.

9 Claims, 1 Drawing Sheet

POLYVINYL CHLORIDE COMPOSITION HAVING ENHANCED LIGHT TRANSMISSION AND REFLECTION CHARACTERISTICS

BACKGROUND OF THE INVENTION

The present invention relates to polyvinyl chloride compositions and, more particularly, to a flexible composition having improved light transmission and reflection characteristics.

The present invention is particularly useful in fiber optic cables and can also be used in other applications for tinted or clear PVC where improved transmission characteristics or improved reflectivity is desirable. Fiber optic cables, i.e., bundles of optical fibers, developed for lateral illumination are generally formed of twisted optical fibers so arranged as to cause light introduced into the ends of the fibers to at least partially escape laterally along the length of the fibers so that the bundled fibers or cable glows similar to a neon light. The bundled fibers are contained by an outer jacket or cover typically formed of a flexible, clear, polyvinyl chloride (PVC). The cable is caused to glow in different colors, e.g., red, yellow, green, etc., by placing a selected color filter at the end of the cable between the end and the light source so that light of the desired color is propagated through the cable.

A disadvantage of fiber optic cables in lateral illumination applications is the attenuation of light through any color filter and through the PVC jacket. The most popular color for signs using fiber optic cables is red and a red filter produces the highest attenuation, e.g., about 12% of the available light will pass through a red filter. Accordingly, the available light is significantly reduced before entering the fiber optic cable. Additionally, the PVC jacket further attenuates the laterally emitted light.

A typical PVC jacket is produced from conventional PVC chemical compositions with a UV stabilizer added. The UV stabilizer tends to give the clear PVC a yellow tint. Another chemical, such as oil of violet, is typically added to counter the yellow tint. In use, the UV stabilized PVC jacket causes the fiber optic cable to emit white light that is in the cool white range, i.e., at about the 4500° K scale on a conventional optical radiation chart. If colored light is being transmitted through the cable, a similar apparent limited frequency emission occurs so that colors do not appear sharp, i.e., red appears more of a rose color than a crisp red. Such an apparent visual softening of the emitted light is believed to be caused by attenuation or filtering in the clear PVC jacket. Thus, it would be advantageous to provide a PVC composition which overcomes the attenuation characteristics of conventional PVC.

SUMMARY OF THE INVENTION

A polyvinyl chloride (PVC) composition includes an active fluorescence or phosfluorescence inducing agent which causes the composition to emit a brighter or hotter appearing light, as compared to conventional PVC compositions, when exposed to white light. In one form, the PVC composition includes barium diphenylaminesulfonate as an additive in a clear or transparent composition and light passing through the composition appears to be hotter than the impinging light. In another form, the additive is barium carbonate and the PVC includes a tinting agent to induce a colored glow when exposed to white light. In all forms, the fluorescence or phosfluorescence inducing agent is selected from a class of materials having the characteristics of creating a frequency shift in a compounded tinting agent when exposed to light.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
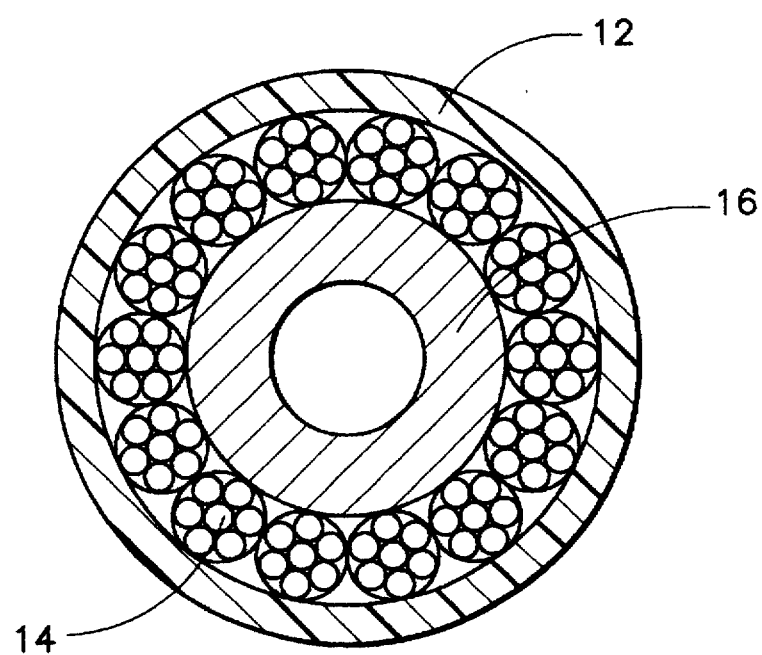
FIG. 1 is a cross-sectional view of a fiber optic cable with which the present invention may be used.

The present invention is disclosed in its application to a lateral illumination fiber optic cable comprising a plurality of individual optical fibers twisted in a conventional manner to form the cable. The cable may include a hollow or solid center core about which twisted fibers are wrapped or otherwise disposed. FIG. 1 is a simplified cross-sectional illustration of such a cable with an outer PVC jacket 12 enclosing a plurality of twisted optical fibers 14. A center core 16 may be used to increase the light output of the cable by providing a reflective surface about which the fibers are disposed.

The jacket 12 may be formed in situ over the optical fibers as shown and described in U.S. Pat. No. 5,333,228 assigned to Super Vision International, Inc. The jacket 12 in conventional practice is formed from commercially available PVC incorporating a UV stabilizer and chemical, such as oil of violet, to counteract the yellow cast introduced in the PVC by the UV stabilizer. Formulations for flexible PVC compounds for use as cable jackets are well known in the art and described in various publications, such as, for example, U.S. Pat. No. 3,868,341. Applicant's invention modifies the conventional PVC formulation by introducing an active phosfluorescent or fluorescence inducing agent selected from the group comprising sodium benzoate, strontium benzoate, strontium stearate, strontianite, zinc phthalocyanine, barium arsenate, barium carbonate (−B), barium citrate, barium molybdate. Preferably, for clear PVC, the selected agent is barium diphenylaminesulfonate ($C_{24}H_{20}B_aN_2O_6S_2$). The mechanism of the chemical or molecular interaction with the PVC compound is unknown but the results are physically, i.e., visually, apparent and unexpected. Although the barium and strontium compounds are somewhat radioactive, both the sodium and zinc compounds listed are believed to produce the desired results since they fall within the classification of fluorescing organic minerals.

If the proportion by weight of barium diphenylaminesulfonate is increased to above about 0.5 parts per 100 parts PVC, the clear PVC becomes opaque with a blue coloration, i.e., the PVC will glow in the blue spectrum when excited by white light. As the concentration of barium diphenylaminesulfonate is reduced below 0.5 parts per 100 parts PVC, transparency gradually returns with the PVC transmitting about 99.4% of applied white light at a concentration of 0.001 parts per 100 parts. For white light transmission, a concentration of 0.01 parts per 100 parts PVC produces a good light transmission ratio for white light but causes an apparent frequency shift in colored light. For example, red light appears to be more violet, apparently because of the blue tint caused by the barium diphenylaminesulfonate.

The visual effect of adding barium diphenylaminesulfonate to the PVC compound, particularly at concentrations of about 0.001 parts per 100 parts PVC, is a brighter, more intense light. For white light, the barium diphenylaminesulfonate additive appears to cause a frequency shift so that the normally "cool white" light now appears hotter. On a spectrum chart, the primary frequency of the transmitted light appears to shift from about the 4500° K line to about the 5700° K line.

While the mechanism by which the addition of barium diphenylaminesulfonate causes the increase in brightness of transmitted light is unknown, it is believed that the effect occurs at the atomic level, i.e., it is believed that the barium diphenylaminesulfonate effects the electron states in the outer shells of the electron structure of some of the elements in the PVC composition. As a result, some electrons in the outer shells become unstable so that light impinging on the PVC composition causes the electrons to change states and create an apparent amplification in the visible spectrum. Measurements of transmitted light show a 26% increase in light passing through a barium diphenylaminesulfonate PVC composition when compared to a conventional PVC composition.

The addition of barium diphenylaminesulfonate to white dyed PVC compounds produces similar enhancement in light quality. For example, if the center core 14 is formulated with PVC, titanium dioxide and barium diphenylaminesulfonate, applicant has observed an 8–10% increase in reflected light from the lateral illumination fiber optic cable as compared to an identical cable without incorporating barium diphenylaminesulfonate in the center core compound. The barium diphenylaminesulfonate enhanced, $T_iO_2$ tinted PVC appears to phosfluoresce when exposed to white light. The $T_iO_2$ dyed, barium diphenylaminesulfonate enhanced PVC compound can be used in other applications where a strong white appearance or reflectivity is desired. Typically, about 12% by weight of $T_iO_2$ with 0.001 parts by weight of barium diphenylaminesulfonate per 100 parts PVC produces a bright white reflective compound.

For lateral illumination fiber optic cables where a constant color light output other than white is desired, formulating the jacket 12 with a tint plus one of the group of active agents other than barium diphenylaminesulfonate has been found to produce sharper, more brilliant colors. Barium diphenylaminesulfonate is not desirable for use with transparent, tinted PVC since the barium diphenylaminesulfonate reacts with the tinting compounds to make the PVC overly dark or even opaque. A preferred compound for tinted, transparent PVC is barium carbonate. Tinting can be achieved in various colors by adding one or more tinting agents selected from the following group:

CIBACRON BRILLIANT RED 3B-A $C_{32}H_{19}ClN_8O_{14}S_7Na_4$

DRIMARENE RED Z 2B 0.95%(HPLC) $C_{20}H_{19}Cl_3N_5Na_3O_{10}S_3$

SUDAN IV, CERTIFIED, 95% (UV-VIS) $C_{24}H_{20}N_4O$

SUDAN BLACK B, CERTIFIED, 99% (UV-VIS) $C_{29}H_{24}N_6$

SUDAN RED 7B $C_{24}H_{21}N_5$

BRILLIANT GREEN, CERTIFIED, $C_{27}H_{34}N_2O_4S$

BRILLIANT YELLOW, CERTIFIED $C_{26}H_{18}N_4Na_2O_8S_2$

BRILLIANT BLUE G $C_{47}H_{48}N_3O_7S_2Na$

BRILLIANT CRESYL BLUE $C_{17}H_{21}ClN_4 0.05Z_nCl_2$

The resultant tinted jacket appears to fluoresce when illuminated internally by white light. Note that for a red cable, white light can be introduced into the optical fibers at a much higher intensity without the intervening color filter, i.e., 100% versus 12% with the filter. A bright red can be obtained from a PVC compound using a red dye having a color reflectivity in the range of 442–467 nanometers and a barium carbonate additive.

What is claimed is:

1. A polyvinyl chloride (PVC) composition which includes between about 0.01 and 0.001 parts by weight, per 100 parts, of barium diphenylaminesulfonate.

2. The composition of claim 1 which includes a white color dye.

3. The composition of claim 2 in which the color dye is titanium dioxide.

4. A polyvinyl chloride (PVC) composition for forming an outer jacket of a lateral illumination fiber optic cable, the composition comprising a mixture for forming a substantially clear PVC jacket and including between about 0.01 and 0.001 parts by weight, per 100 parts PVC, of barium diphenylaminesulfonate.

5. The composition of claim 4 wherein the cable includes a reflective central core comprising a PVC composition which includes about 12 parts by weight of titanium dioxide per 100 parts PVC.

6. The composition of claim 5 wherein the central core composition includes between about 0.01 and 0.001 parts by weight per 100 parts of barium diphenylaminesulfonate.

7. A polyvinyl chloride (PVC) composition which includes between about 0.5 and 0.001 parts by weight, per 100 parts PVC, of a fluorescence inducing agent selected from the group comprising sodium benzoate, strontium benzoate, strontium stearate, strontianite, zinc phthalocyanine, barium arsenate, barium carbonate (–B), barium citrate, barium molybdate and barium diphenylaminesulfonate.

8. The composition of claim 7 and including a coloring agent dispersed into the composition for tinting the composition.

9. The composition of claim 8 in which the coloring agent is a red pigment having a color reflectivity in the bandwidth of 442–467 NM and the fluorescence inducing agent is barium carbonate.

* * * * *